ized radiographic images selected from a series of such images acquired before and after the contrast appears in the region of interest during a dynamic imaging study.

United States Patent [19]

Hunt et al.

[11] 4,335,427
[45] Jun. 15, 1982

[54] METHOD OF SELECTING A PREFERRED DIFFERENCE IMAGE

[75] Inventors: Willard F. Hunt, Cleveland; Robert H. McCarthy, Chagrin Falls, both of Ohio

[73] Assignee: Technicare Corporation, Solon, Ohio

[21] Appl. No.: 142,188

[22] Filed: Apr. 21, 1980

[51] Int. Cl.³ .................... G06F 15/42; H04N 5/32
[52] U.S. Cl. .................... 364/414; 358/111; 358/166; 364/515
[58] Field of Search ............ 364/414, 515; 250/323, 250/340, 445 T; 358/93, 111, 166; 430/966, 967

[56] References Cited

U.S. PATENT DOCUMENTS

| 3,283,071 | 11/1966 | Rose et al. | 358/93 |
| 3,894,181 | 7/1975 | Mistretta et al. | 358/111 |
| 3,974,386 | 8/1976 | Mistretta et al. | 358/111 |
| 4,204,225 | 5/1980 | Mistretta | 358/111 |
| 4,204,226 | 5/1980 | Mistretta et al. | 358/111 |
| 4,212,062 | 7/1980 | Kohno et al. | 364/414 |

OTHER PUBLICATIONS

Ort et al.; "An Improved Technique for Enhancing Small Periodic Contrast Changes in TV Fluoroscopy"; Optical Engineering; vol. 12, No. 5, 1973; pp. 169-175.

Primary Examiner—Errol A. Krass
Attorney, Agent, or Firm—Michael A. Kaufman; Robert W. Brown

[57] ABSTRACT

In a radiographic digital subtraction system utilizing a contrast agent for enhancing a difficult-to-image anatomic region of interest, a method of selecting a superior difference image. The difference image selected represents the differential between a pair of digitized radiographic images selected from a series of such images acquired before and after the contrast appears in the region of interest during a dynamic imaging study.

8 Claims, 1 Drawing Figure

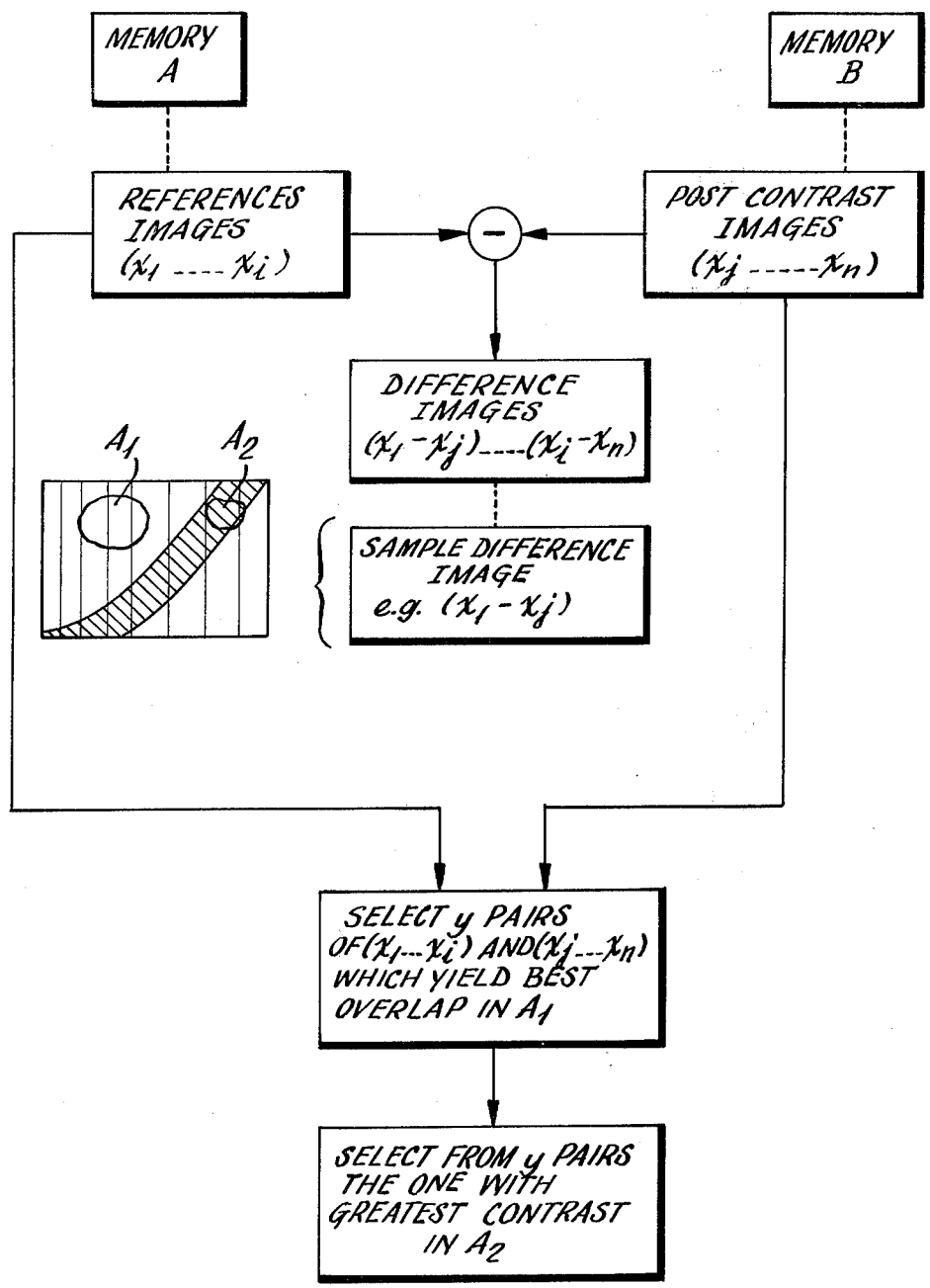

METHOD OF SELECTING A PREFERRED DIFFERENCE IMAGE

TECHNICAL FIELD

This invention relates to dynamic image enhancement of low contrast anatomic regions utilizing a contrast material introduced into a patient during the acquisition of a series of radiographic images. In particular, the invention relates to a method of selecting a preferred difference image representing the differential between a reference or mask image acquired before the contrast material takes effect and a later acquired post-contrast image.

BACKGROUND ART

In a copending application Ser. No. 138,400 of Robert Henry McCarthy, filed Apr. 8, 1980, for DYNAMIC IMAGE ENHANCEMENT AND APPARATUS THEREFOR and assigned to the assignee of the present invention, there is disclosed a digital subtraction radiographic system for image enhancement of low contrast objects utilizing venous injection of a contrast material to visualize a difficult-to-image anatomic region of interest. In the digital subtraction system, disclosed in the copending application, a radiographic digitized composite mask image of a region of interest of a patient is acquired and stored in a first digital memory. During the clinical procedure, a quantity of contrast material, preferably an X-ray opaque dye, is introduced into the patient. Depending on several factors including the type and quantity of contrast material, physical characteristics of the patient, and the distance between the remote vein and the region of interest, such as a carotid artery, the time for the contrast material to take effect varies, typically between approximately 10 and 15 seconds. After the contrast material takes effect, a second radiographic image substantially of the same region of interest as the reference image is acquired and stored in a digitized form in a second digital memory. Alternative techniques are disclosed for subtractively combining the two digitized images to cancel the overlapping background, thereby enhancing the region of interest which shows the contrast material. The resultant subtracted image, known as a difference or differential image, devoid of a significant amount of non-useful background information, permits superior clinical evaluation of the difficult-to-image region.

A clinical investigator about to perform a diagnostic study involving the acquisition of a series of radiographic images generally will not know beforehand the length of time for the contrast material to take effect in the anatomic region of interest after injection since there are so many factors in this determination. Thus, an image acquired early in the study, typically the first such image, will be designated the reference or mask image. Each subsequently acquired image then becomes a candidate for the post contrast image to be subtracted from the mask to yield the desired difference image.

The ideal difference image is generated from the pair that permits the greatest amount of cancellation of background or non-useful information and yields the most information in the region of interest. The first condition requires a high degree of overlap of the two images which is determined principally by the degree of movement in the imaged region. The second condition is a function of the concentration of contrast material in the region of interest and this is a function of time.

Patient movement, both voluntary and involuntary, has posed a sufficient clinical problem that the investigator would prefer to use as the mask, an image which comes as close in time as possible prior to the appearance of a substantial quantity of contrast material in the region of interest to significantly minimize motion between the time of the acquisition of the mask and the acquisition of the post contrast image. Hence, the resultant difference would provide the desired high contrast in the region of interest with maximum overlap and hence cancellation of the non-useful background.

For any given mask, the system disclosed in the aforementioned copending application, permits generating a series of difference images by subtracting from the mask, independently and sequentially, any other image, i.e. a post contrast image, and viewing the difference. Though a trained physician can typically and rather expeditiously select the best difference image once a mask is preselected, the result will not necessarily yield the best difference image available in the study since the original choice of mask may not have been the best since the choice was at best an informed guess. Moreover, even if this process were generally acceptable when performed by an experienced investigator, the technique is not likely to consistently yield acceptable clinical results when operated on a grand scale.

The procedure of introducing contrast material into the object studied is complex and must be coordinated with the operation of an X-ray system and data collection system. To require concurrent analysis and decision making on the quality of images acquiring burdens the operators and the system. The present invention permits the data to be collected over a long enough time interval to insure the collection of the best mask and data (contrast) image. Then, as a leisurely post-processing operation, one can select the best pair of images to subtractively combine. Furthermore, since the contrast material does not necessarily reach all parts of the image at one time, it is doubtful whether the a priori selection of a single mask would be adequate to an analysis of the entire image.

DISCLOSURE OF THE INVENTION

Applicants have discovered a "remasking" technique for consistently generating a preferred difference image from a series of images acquired during a dynamic imaging study. The improved method requires a minimum of training and a minimum of operator time.

The method is applied in a radiographic, digital subtraction system for imaging a low contrast anatomic region of interest of a patient by acquiring a plurality of mask or reference images of the region of interest, introducing into the patient a contrast material suitable for enhancement of a clinically relevant region, acquiring a plurality of post contrast images of the anatomic region and generating a plurality of difference images in which overlapping portions are significantly eliminated by digitally subtractively combining a plurality of pairs of reference and post contrast images.

The improved method comprises storing the plurality of reference and post contrast images acquired during the study. As a practical matter, the series of images need not even be designated as pre or post contrast, but merely stored. The method further comprises selecting a sample difference image which shows contrast material in the clinically relevant region of anatomic interest. The sample difference image is viewed on a video display and a first area from the region showing contrast material is identified. Similarly, a second area is identified from the background portion of the image, the background portion showing at most a minimal amount of contrast material. Each area from either region is recorded, preferably electro-optically, such as by a light pen or joystick. The stored reference and post contrast images are then searched to select those pairs which when subtractively combined yield the best difference images in terms of maximum overlap of background. Finally, from the difference images so selected, the one which exhibits the greatest activity in the contrast region is selected as a preferred difference image for clinical analysis.

BRIEF DESCRIPTION OF THE DRAWINGS

The single FIGURE is a schematic flow diagram showing steps of the present invention.

BEST MODE OF CARRYING OUT THE INVENTION

Referring to the drawing, a series of radiographic digitized reference or mask images are chronologically acquired and serially stored in a Memory A. These images visually represent a clinically relevant region of interest of a patient acquired before a contrast agent introduced into the patient takes effect. After the contrast agent or material takes effect another series of digitized images are chronologically acquired and serially stored in Memory B. The total study per patient includes a series of n composite frames where n is typically approximately 30. Of the n frames in a study the pre-contrast portion is designated $x_1 \ldots x_i$ and the post-contrast portion is designated $x_j \ldots x_n$.

The operator of a multi-memory radiographic digital subtraction system to which reference has been made hereinabove under the Background Art portion of this application, may be remote computer control, view a sample difference image generated by subtracting a post-contrast image (taken from the group $x_j \ldots x_n$) from a pre-contrast or reference image (taken from the group $x_1 \ldots x_i$). While all possible difference images $(x_1-x_j) \ldots (x_i-x_n)$ can conceivably be generated and stored, such a procedure would be inefficient and costly as well as requiring an undue length of time for a clinician to review. As an alternative, a sample difference image, for example, $x_1-x_j$, is generated and displayed on a video screen for viewing. The sample difference image $x_i-x_j$ must be one that includes both a portion of the clinically relevant region of interest showing contrast material as indicated by the diagonally cross-hatched portion of the illustrated sample difference image on the drawing and the background region showing little or no contrast material indicated by the vertical lines on the drawing representative of the motion artifact. On such a sample difference image $x_1-x_j$ an area $A_1$ is selected from the background portion and an area $A_2$ is selected from the clinically relevant region of interest showing contrast material. Enclosed regions $A_1$ and $A_2$ represent some random number of addresses of the, for example, 256×256 pixel array of the video screen (not shown) that is provided in a radiographic digital subtraction system. The selected areas $A_1$ and $A_2$ are electro-optically recorded, preferably by a light pen or joystick. Once these regions $A_1$ and $A_2$ are identified and recorded all address points falling therewithin can be quickly searched on any stored image.

During a study all of the images n are stored on a mass storage device, such as on tape or disk. The next step in the preferred method is to search through the n images on all points falling within areas $A_1$ and $A_2$ to select a predetermined number of pairs y of images (one from the group $x_1 \ldots x_i$ and one from the group $x_j \ldots x_n$) which yield the best overlap in region $A_1$. The best overlap is provided by those pairs which when subtractively combined yield difference images in which region $A_1$ has the lowest composite values denoting the least level of motion artifact. This is done, for example, by summing the values of the differences of each address falling within the region $A_1$ and selecting the lowest cumulative totals, or by finding the mean difference or some other convenient index. The predetermined number of such pairs y may, for example, be 10. After this search and select step the y difference images generated are searched to determine which one has the greatest activity, i.e. showing the most contrast material in region $A_2$, as indicated by the highest cumulative values generated in region $A_2$ after subtraction. The difference image which is selected in this step is a preferred difference image.

Alternatively, the post contrast image showing the most contrast material in region $A_2$ can be pre-selected. Region $A_1$ of that pre-selected image can be compared with each of the remaining stored images to select the one which when subtractively combined with the pre-selected post-contrast image will yield the greatest cancellation in the background region.

We claim:

1. A method of selecting one or more x-ray difference images from a group of x-ray images, which comprises the steps of:
   (a) obtaining first and second pluralities of x-ray images of a patient or subject, each x-ray image being obtained at a different time;
   (b) obtaining a sample difference image representing the difference between one of the images of the first plurality of images and one of the images of the second plurality of images;
   (c) selecting a region of the sample difference image, the region being less than the entire area of the sample difference image;
   (d) pairing images selected from the first plurality of images with images selected from the second plurality of images;
   (e) obtaining a plurality of difference images each representing the difference between the images of one of the pairs of images;
   (f) searching regions of the difference images, the searched regions corresponding, respectively, to the selected region of the sample difference image; and
   (g) selecting one or more difference images, the selected difference images having searched regions that satisfy a predetermined condition or index.

2. A method according to claim 1, wherein the region of the sample difference image is selected at a time subsequent to the time at which the first of the images is obtained.

3. A method according to claim 1, wherein the images are digital video images each formed by a matrix of pixels.

4. A method according to claim 3, wherein the pixels of each image are stored on a mass storage device, the searching of regions of the images being accomplished by processing of pixel data assigned to computer memory address locations related to the assigned computer memory addresses of pixels in the selected region of the sample difference image.

5. A method according to claim 4 wherein the pixel values in the searched regions are mathematically processed to obtain a result which is compared with a reference value based upon pixel values in the selected region of the sample difference image.

6. A method according to claim 1, wherein a second region of the sample difference image is selected, the second region being less than the entire area of the sample difference image, the first-mentioned region having substantially different contrast characteristics than the second region.

7. A method according to claim 1, which further includes the steps of:

(h) selecting a second region of the sample difference image, the second region being less than the entire area of the sample difference image and different than the first-mentioned selected region;

(i) in the difference images selected according to step (g) of claim 9, searching such selected difference images in regions thereof corresponding, respectively, to the second selected region of the sample difference image; and (j) selecting one or more difference images, the selected difference images having searched regions, corresponding to the second selected region of the sample difference image, that satisfy a predetermined condition or index.

8. A method according to claim 7, wherein one of the selected regions of the sample difference image is a region having a high degree of contrast with the background of the sample difference image and wherein the other of the selected regions of the sample difference image is a region having a low degree of contrast with the background of the sample difference image.

* * * * *

UNITED STATES PATENT AND TRADEMARK OFFICE
CERTIFICATE OF CORRECTION

PATENT NO. : 4,335,427
DATED : June 15, 1982
INVENTOR(S) : Willard F. Hunt & Robert H. McCarthy It is certified that error appears in the above—identified patent and that said Letters Patent is hereby corrected as shown below:

At Column 3, Line 39, "be" should be -- by --.
At Column 6, Line 4, "9" should be --1--.

Signed and Sealed this

First Day of March 1983

[SEAL]

Attest:

GERALD J. MOSSINGHOFF

*Attesting Officer*   *Commissioner of Patents and Trademarks*